Figure 1:
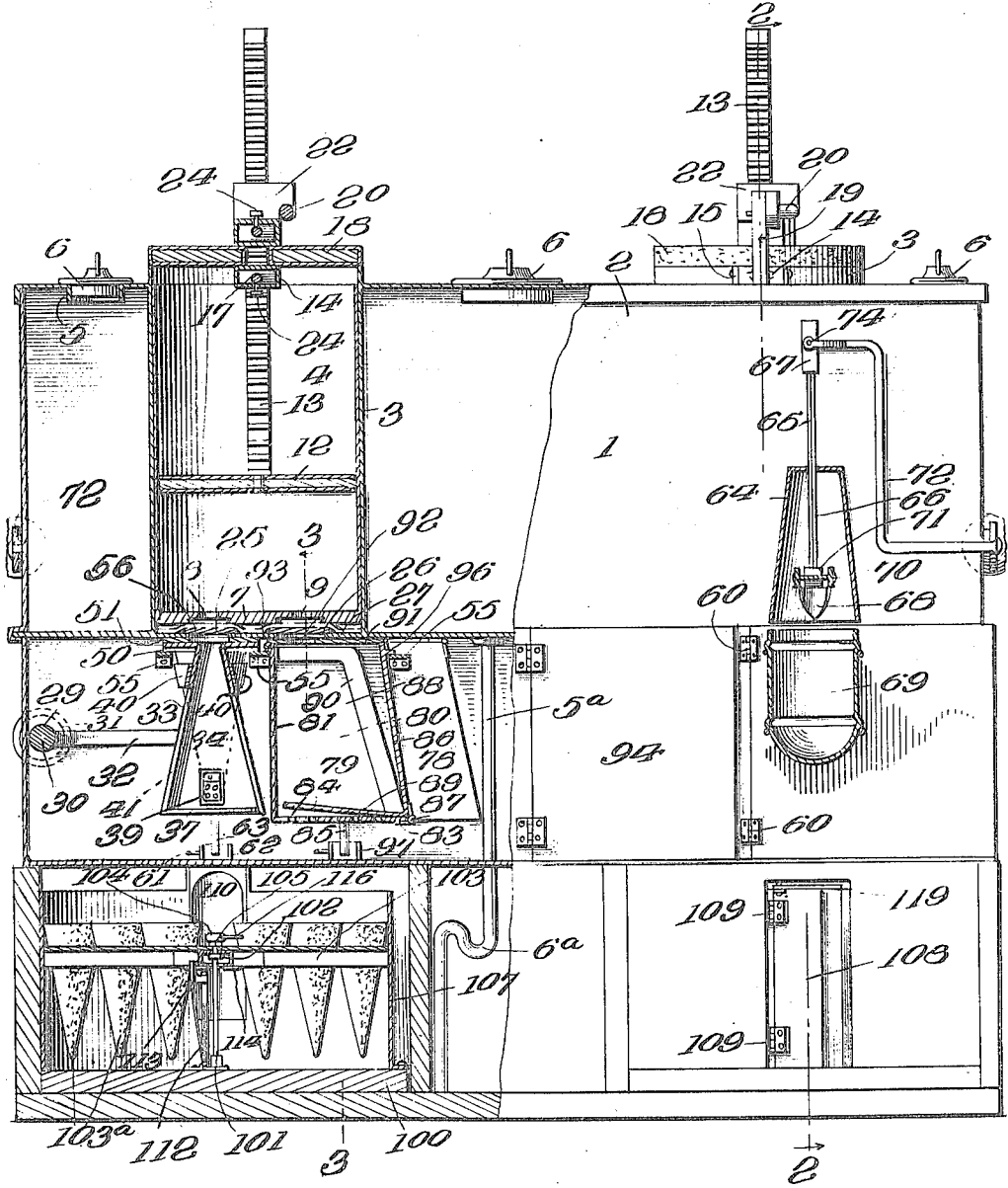

J. W. KENNEDY.
APPARATUS FOR DISPENSING SEMISOLID SUBSTANCES.
APPLICATION FILED DEC. 9, 1915.

1,197,211.

Patented Sept. 5, 1916.
4 SHEETS—SHEET 1.

Witnesses
Floyd R. Cornwall
Robt. E. Barry

Inventor
James W. Kennedy
By
Attorneys

J. W. KENNEDY.
APPARATUS FOR DISPENSING SEMISOLID SUBSTANCES.
APPLICATION FILED DEC. 9, 1915.
1,197,211.
Patented Sept. 5, 1916.
4 SHEETS—SHEET 2.
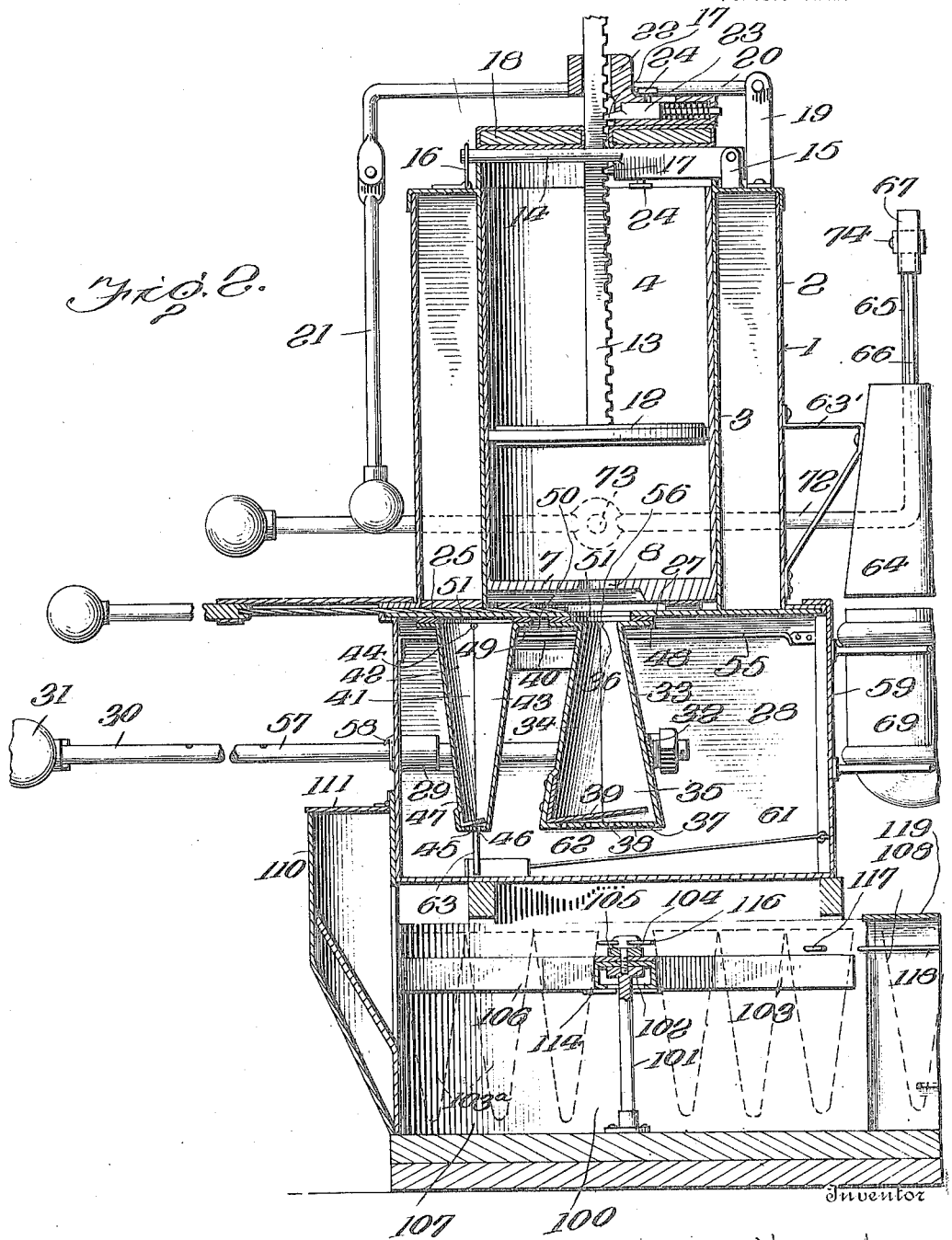
Witnesses
Floyd R. Cornwall.
Robt. E. Barry.
Inventor
James W. Kennedy
By
Attorneys

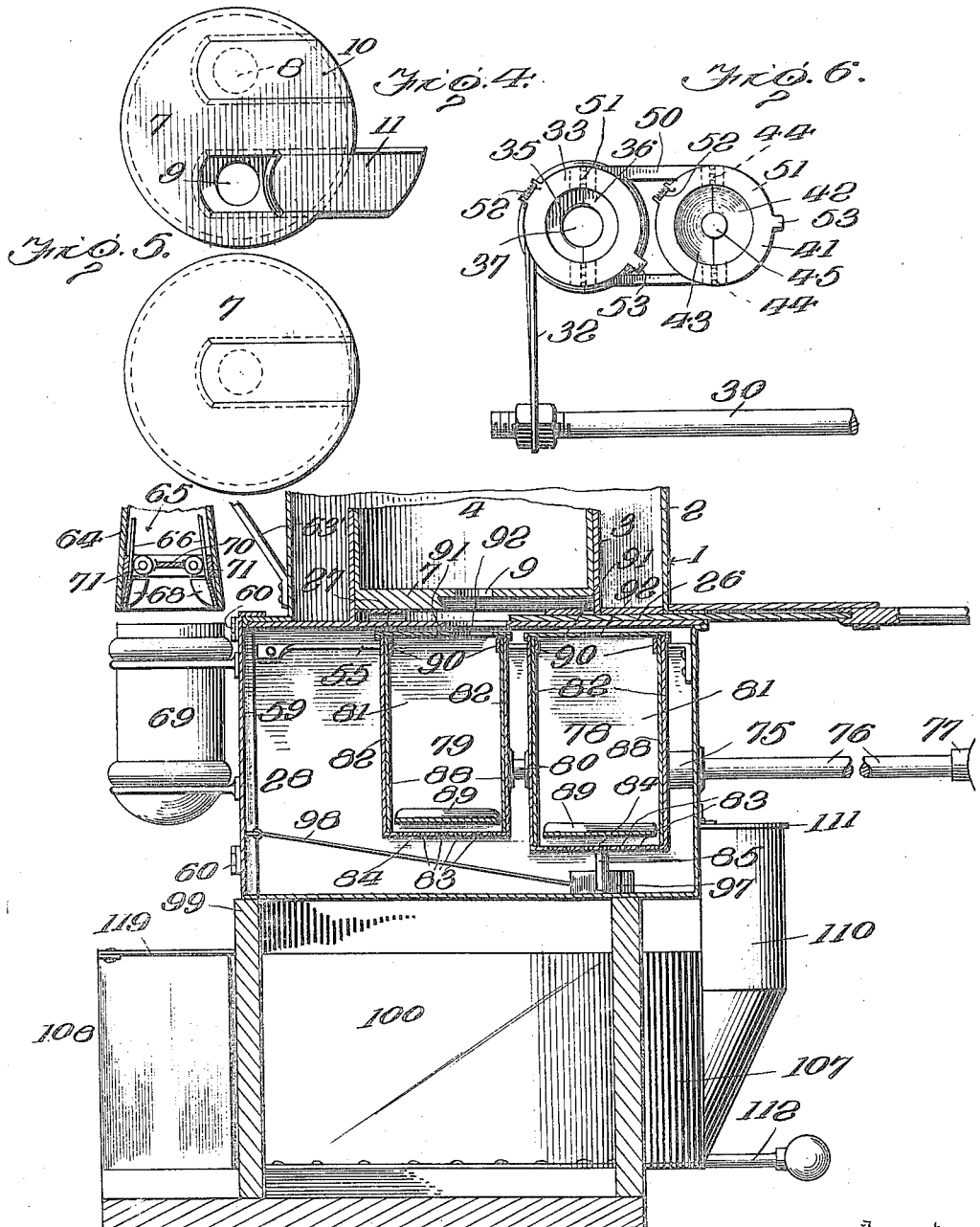

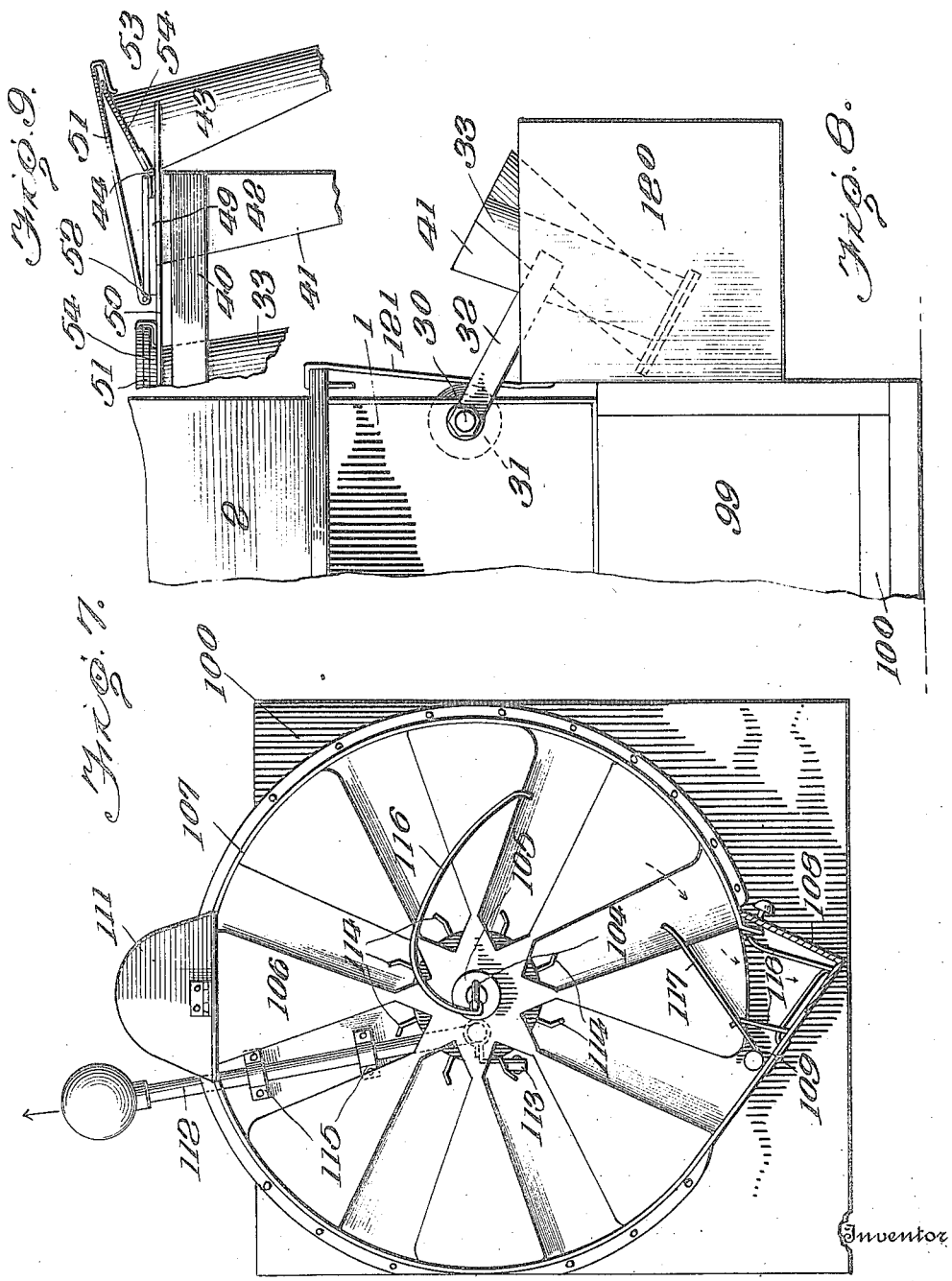

UNITED STATES PATENT OFFICE.

JAMES W. KENNEDY, OF CANTON, OHIO, ASSIGNOR OF TWO-FIFTHS TO FRANK L. PALM AND ONE-FIFTH TO W. HOWARD PALM, BOTH OF CANTON, OHIO.

APPARATUS FOR DISPENSING SEMISOLID SUBSTANCES.

1,197,211.  Specification of Letters Patent.  Patented Sept. 5, 1916.

Application filed December 9, 1915. Serial No. 65,965.

*To all whom it may concern:*

Be it known that I, JAMES W. KENNEDY, a citizen of the United States, residing at Canton, in the county of Stark and State of Ohio, have invented certain new and useful Improvements in Apparatus for Dispensing Semisolid Substances; and I do hereby declare the following to be a full, clear, and exact description of the invention, such as will enable others skilled in the art to which it appertains to make and use the same.

My invention consists in the novel features hereinafter described reference being had to the accompanying drawings, in which I have shown one form or embodiment of my invention selected by me for purposes of illustration, and the said invention is fully disclosed in the following description and claims.

Referring to the drawings, Figure 1 is a front view partly in section showing my improved apparatus for dispensing semi-solid substances, such as ice cream or the like. Fig. 2 is a transverse vertical sectional view of the same taken on line 2—2 of Fig. 1. Fig. 3 is a similar view taken on line 3—3 of Fig. 1. Fig. 4 is a detail, showing the bottom of one of the special semi-solid containers, the said container bottom having a plurality of openings closed by sliding valves or cut-offs. Fig. 5 is a similar view of a modified form of can bottom, having but one opening and valve. Fig. 6 is a detail showing the molds for forming the substance into cone shape after it has been forced from the container into said molds. Fig. 7 is a top plan view of a detail showing the carrier for supporting and conveying the edible cones, into which the substance may be dropped from the mold, which forms the same. Fig. 8 is a detail showing one of the washing receptacles and the manner of dipping the cone shaped molds therein. Fig. 9 is a detail showing the construction of one of the cone-shaped molds, the lower end of said mold being broken away.

In dispensing ice cream or the like, it is at present customary to remove the cover of the receptacle or can in which it is contained and insert a ladle or the more generally used cone-shaped disher. This method has many disadvantages. For example, dust and the like may enter the can during the period in which the cover is off and the hand of the person serving the cream, must also be inserted into the can, whereby the contents may become contaminated. Furthermore, the frequent opening of the can permits the atmosphere to contact with the ice cream and melt it, so that the cream last served from the container, is often too soft to be used.

The main object of my invention is to provide means whereby the cream may be served from a sealed receptacle without necessitating contact therewith by the hands of the server or the opening of the receptacle from the time it is placed in my dispensing apparatus, until it is emptied, and further to provide means whereby the serving of the cream is more quickly and easily effected and melting or waste thereof prevented.

My invention contemplates means for discharging a semisolid substance from a receptacle, in connection with various shaped molds, into which the said substance is projected and molded into the desired form, and means for opening said molds to permit the contents thereof to drop into an edible cone, a saucer or a box, depending on the particular mold used.

With the foregoing general objects outlined, and with other objects in view, which will be apparent, as the nature of the invention is better understood, the present invention resides in the combination and arrangement of parts, and in the details of construction hereinafter described and claimed, it being understood that changes in the precise embodiment of the invention herein disclosed, may be made within the scope of the appended claims and without departing from the spirit of the invention.

In the drawings 1 designates a casing, in which the delivery portion of my apparatus is located, and it is provided with an upper portion 2, having cylindrical members 3, in which the cream receptacles 4 are inserted from the top. The upper portion 2 forms an ice container for maintaining the contents of the receptacles 4 in proper condition, the ice being inserted in the portion 2, through apertures 5, in the top thereof closed by covers 6. A drip pipe 5ª having a trap 6ª is provided in said casing, for conducting the water from the ice chamber to the exterior of the apparatus. The bottoms 7 of the cans 4 are provided with a plurality of apertures 8 and 9 which, during transportation of the cans, are closed by slide valves 10 and 11, which are removed when the cans are placed in the cylindrical members 3.

As illustrated, the apparatus is constructed to use two cream receptacles, containing two differently flavored creams, but in practice the device may be built to dispense one kind of cream, as shown in Fig. 4, or more than one kind as shown in Fig. 5 and as the dispensing mechanism will be the same for each cream receptacle 4, it is thought that a description of one only will be sufficient.

After the valves 10 and 11 together with the top, have been removed from the cream receptacle, the can is inserted in the member 3, and a plunger 12 having a rack 13, is placed on the upper surface of the cream. The rack extends upwardly through a cross piece 14, which is pivoted at one end to a post 15 on the upper surface of the casing 1, and its other end is detachably held by a catch 16. A spring pressed latch 17 is mounted in said cross piece and is adapted, when said piston or plunger 12 is fed downwardly, to engage said rack 13 and prevent the same from moving upwardly. A pad 18 is adapted to be placed on the rack 13, just over the cross piece 14, to prevent air from entering the can after the plunger has been placed in the same.

Mounted upon the upper surface of the casing 1, is a post 19, to which is pivoted an operating lever 20, carrying an operating handle 21. Rigidly secured to said lever 20 is an apertured lug 22 through which the rack 13 passes and a spring pressed pawl 23, is carried by said lug and engages said rack. When the handle 21 is drawn downwardly, the pawl 23 depresses the rack, and when the handle is raised the pawl 23 rides over the teeth of said rack. In assembling the plunger operating mechanism, the cross piece 14 and the lever 20 are swung into vertical positions on their pivots and the rack 13 is first inserted through the aperture (not shown) in the cross piece 14, then through the apertured lug 22, the spring pressed pawls or latches 17 and 23 being held away from the rack, by means of operating buttons 24. After the rack has been placed, the lever 20 is swung downwardly and the catch 16 is placed over the free end of the cross piece. Now should the handle 21 be pulled downwardly, the plunger 12 descending in the can, will force a portion of the contents thereof through the apertures 8 and 9 in the bottom of the same. Slide valves 25 and 26 are mounted in the bottom 27 of the cylindrical member 3, and when these are closed, no cream can be ejected from the can, but when the valves are opened, the cream may be forced downwardly into the molds, hereinafter described.

Located below the portion 2 of the casing, is a chamber 28, which houses the molds and their operating mechanism, which will now be described. Mounted in the rear wall of the chamber 28, is an elongated bearing 29, and a rod 30, having an operating handle 31, is mounted in said bearing for sliding and rotating movement. Rigidly secured to said rod is an arm 32, carrying at its free end the mold 33, which is shaped to mold an inverted cone for serving in a saucer. This mold 33 is formed in two parts 34 and 35, which are hinged together at their upper ends as shown at 36. The part 34 which is movable, carries the bottom 37 of the mold and apertures 38 are provided in said bottom, for allowing air to escape from the mold, while the same is being filled and a spring flap 39 is also provided in the bottom of the mold for closing said apertures when the mold is filled. Tie rods 40 extend from the stationary part 35, of the mold 33 and support a cone-shaped mold 41, which is shaped to drop a molded article into an edible cone. This mold 41 is also made of two parts 42 and 43 hinged together at their upper ends, as shown at 44 and the part 42, which is movable, carries the bottom 45 having air releasing apertures 46, and a spring flap 47 for closing the same. Flanges 48 and 49 on the upper ends of the stationary parts 35 and 43 of the molds, are rigidly connected by means of plates 50. An annular plate 51 is pivotally connected to each of the stationary parts of the molds by means of spring hinges 52, and said hinges normally force said plates toward the stationary parts of the molds and act to maintain the two parts of the molds in closed position. Diametrically opposite said hinges are hook-shaped members 53, which engage the flanges 54 of the movable members of the molds, and when said molds are opened, by the mechanism hereinafter described, said members 53 move on the flanges 54, without disengaging the same, as shown in Fig. 9. Tracks or guides 55 are provided beneath the top of the chamber 28, and the plates 50 on the opposite sides of the molds engage said guides and thereby hold the upper ends of the molds in close contact with the roof of the chamber 28 and an aperture 56 is provided in said roof directly beneath the aperture 8 of the can, so that the cream forced from the can will be projected directly into the mold, which is positioned below the aperture 56. As shown in Fig. 2 the "saucer" mold 33 is in position below the aperture 56, but when it is desired, the mold 41 may be placed in position beneath the aperture 56 by forcing the rod 30 to the right until the notch 57 on said rod is engaged by a resilient finger 58 on the casing 1.

A door 59 is hinged at 60 to the casing 1 at one end of said chamber 28 and when said rod is pushed far enough toward the right, the mold 33 will engage said door and force the same open. This door 59 carries on its inner side a rod 61 which is provided at its free end with a curved foot 62 which travels along the floor of the chamber 28, when the door 59 is opened and closed. To close said door I have provided one of the molds with a depending lug 63, which engages the foot 62 when the molds are drawn into the chamber by the rod 30, and thus causes the door to shut.

A bracket 63' is rigidly secured to the casing 1 on the front thereof and carries an inverted cone-shaped frame 64 in which is mounted for vertical reciprocation the mold opener and scraper 65. The mold opener and scraper 65 consists of a plurality of depending legs 66 which pass through an aperture in the top of the frame 64 and are connected at their upper ends to a member 67 and said legs are provided at their lower ends with scrapers 68 which are spaced sufficiently far enough apart so as to enter the upper end of the molds 33 or 41 and are adapted when forced downwardly, to enter either a washing receptacle 69 carried by the door 59, when the door is closed, or one of the molds 33 or 41, when the door is opened and either of said molds lies directly beneath said opener and scraper. In order to facilitate the spreading of the scrapers 68 to open the molds, I have provided the lower portion of the interior of the frame 64 with a spider 70 having rollers 71, which bear against the inner sides of the legs 66 and cause the same to spread, when the legs are forced downwardly. An operating lever 72 is pivoted to the side of the casing at 73 and has its front end bent at right angles horizontally, then at right angles vertically and finally at right angles horizontally, the free end of the lever being pivotally connected at 74 to the member 67 at the upper ends of the legs 64. When one of the molds 33 or 41 has been filled, and the mold has been pushed out of the chamber 28, to a position below the mold opener and scraper 65, the rear end of the lever 72 is raised, and this will cause the member 65 to enter said mold, open the same, scrape the cream from its sides and drop the molded cream into a saucer or edible cone, as the case may be. The action of the scrapers 68 in spreading the molds apart is as follows: As the scrapers descend and enter the mold through the ring 51, they engage the downwardly and inwardly sloping walls of the mold 41 or the downwardly and outwardly sloping walls of the mold 33, and owing to the outward pressure imparted to the scrapers through engagement of their legs with the rollers 71 on the spider 70, this pressure is exerted against the walls of the mold and the mold sections are rocked about on their pivot points 44 and 36. After the cream has been dropped from the mold the member 65 is raised and the spring hinge at the upper end of the mold causes the same to close.

The molds and their operating means just described are for the purpose of dispensing what are known to the trade as "ice cream cones" and "saucer shape" but in order that boxes and the like may also be filled by my apparatus, I have provided box molds and their operating means, which I shall now describe.

Mounted for sliding and rotative movement in a bearing 75 on the rear of the chamber 28, is a rod 76 having an operating handle 77 which is located outside of the casing and secured to the free end of the rod and located within the chamber 28, is a quart box mold 78. A pint box mold 79 is connected to the mold 78 by a connecting rod 80. Each of these box molds are of similar construction and is it thought that a description of one will be sufficient. The mold 78 comprises a stationary side 81, stationary ends 82 and a stationary bottom 83, having apertures 84 and a foot piece 85. A movable side 86 is hinged to the bottom at 87 and is provided with rigidly connected ends 88 and bottom 89, which swing in and out of the stationary parts of the mold between the ends thereof and cutters 90, which are arranged on the ends 82 of the mold and are spaced apart from the same, to permit the passage of the parts 88 and 89. A cover 91 having an aperture 92 is hinged to the upper end of the movable side 86, and has a locking flange 93 which engages the upper end of the side 81 to hold the mold in closed position. When the aperture 92 of either of the box molds is positioned directly beneath the aperture 9 of the can and the valves 11 and 26 are in open position, the cream may be forced into said mold. After the box mold has been filled the rod 76 is pushed inwardly and the box molds are forced through a hinged door 94 on the front of the casing 1, to the exterior of the chamber 28. The cover 91 is then raised and the side 86 swung downwardly and with it the molded cream, which will be dropped into a box held by the operator. The tracks 55 near the roof of the chamber 28 are engaged by the flanges 96 on the upper ends of the box molds when the rod 76 is drawn outwardly and these tracks guide the molds and assist in bringing the apertures in the tops of the same into position beneath the can aperture. To close the door 94, the foot piece 85 engages a curved rod 97 carried by a rod 98 secured to said door and sliding on the floor of the chamber 28.

My apparatus has been constructed primarily to dispense "ice cream cones" and in order that a "cone" may be served to the purchaser without the hand of the operator touching either the cream or the edible cone, I have provided an edible cone carrier which supports a number of edible cones and brings them consecutively into position beneath the mold opener 65, so that the molded cream may be dropped into an edible cone, which cone can then be taken from the apparatus by the purchaser.

Located beneath the chambers 28, in a housing 99 as best shown in Fig. 7, are a plurality of sliding drawers 100, having open tops and which may be drawn rearwardly toward the operator for the purpose of opening the same. Mounted in the center of each of these drawers 100, is a vertical shaft 101, having at its upper end an annular bearing 102 and a cone carrier 103, supporting the edible cones 103ª is mounted on said bearing, for rotative movement. A thumb screw 104 passes through a washer 105 and through an aperture in the cone carrier 103 and then into a screw threaded hole in the bearing for securing said carrier to said bearing. The cone carrier comprises a series of radial spokes 106 which are formed from a circular sheet of metal by slitting the same radially and then turning the radial edges back to form the spokes. As shown, the cone carrier is adapted to support three cones between adjacent spokes and a circular wall 107 extends upwardly from the floor of the drawer 100, and surrounds the periphery of said cone carrier to prevent the cones from moving outwardly off of the carrier except at the front of the drawer, through a door 108, which is V-shaped and swiveled to said circular wall by spring hinges 109. In order to fill the spaces of the carrier 103, with cones, I have provided on the rear side of said circular wall, a chute 110, down which the cones are fed into said spaces, when its door 111 is open. After filling one of the spaces between adjacent spokes 106, with cones, the carrier 103 is revolved to bring the next space into register with said chute 110. The means for revolving said carrier comprises an operating rod 112 which extends outside of the rear of said drawer 100 and has its inner end bent upwardly and provided with a spring pawl 113, which is adapted to engage teeth 114, provided on said carrier and cause said carrier to rotate slightly each time the rod 112 is pulled rearwardly. When the rod 112 is pushed forwardly the pawl 113 will ride over the teeth and will not move the carrier. The rod 112 is secured in said drawer by means of bearings 115, through which it slides.

A wire 116 has one of its ends rigidly secured to the thumb screw 104, and has its free end projecting into the path of the cones 103ª supported by the cone carrier for the purpose of forcing said cones toward the circular wall 107 and another wire 117 is provided upon the wall and projects into the path of the cones, for the purpose of guiding the cones nearest the wall into wire supports 118 carried by the door 108. When a cone has been brought into position in the wire supports 118, the cream from the cone mold is dropped into it, and the purchaser then opens the door 108 and extracts the filled edible cone. During the dispensing of "ice cream cones" the top of the door 108 is opened, but when it is desired to serve a saucer the top of said door is closed by a sliding cover 119 and the saucer may rest on said cover.

In order to wash the cone and saucer molds after they have been used, I have provided on the exterior of the casing 1, adjacent the chambers 28, washing tanks 120 which are suspended by hooks 121, as best shown in Fig. 8. Assuming said molds to be outside the chamber 28, the rod 30 is given a half turn to bring the molds into position opposite their original position then the rod is pulled until the molds come into position over the tank 120 when by turning said rod, the molds will be dipped into said tank and washed.

From the foregoing description, it is believed that the operation of my device will be apparent to those skilled in the art and further description is thought unnecessary.

What I claim and desire to secure by Letters Patent is:—

1. An apparatus for dispensing frozen substances, comprising a container surrounded by a cooling chamber and provided with an outlet aperture, means for forcing the contents of said container through said aperture, a separable mold mounted adjacent to said aperture for receiving the contents from the container and means for opening said mold to permit the contents thereof to drop into a receptacle.

2. An apparatus for dispensing frozen substances, comprising a container surrounded by a cooling chamber and provided with an outlet aperture, means for forcing the contents of said container through said aperture, a plurality of differently shaped separable molds movably mounted adjacent to said aperture for receiving the contents from the container, and means for opening said molds to permit the molded contents thereof to drop into a receptacle.

3. An apparatus for dispensing frozen substances, comprising a container for the substance surrounded by a cooling chamber and provided with an outlet aperture, means for forcing the contents of said container through said aperture, a plurality of differently shaped separable molds movably mounted adjacent to said container aperture for receiving the contents from the container, means for bringing either of said molds into alinement with said aperture, and means for opening said molds to permit the molded contents thereof to drop into a receptacle.

4. An apparatus for dispensing semi-solid substances, comprising a cooling chamber, a closed chamber located within said cooling chamber and provided with an outlet aperture, a container for the substance located in said closed chamber and provided with an outlet aperture which registers with the aperture of the closed chamber, means for forcing the contents of said container through said apertures, a separable mold mounted adjacent to said apertures for receiving the contents from the container, and means for opening said mold to permit the contents thereof to drop into a receptacle.

5. An apparatus for dispensing semi-solid substance, comprising a casing, a closed chamber mounted in said casing and spaced away therefrom to form a cooling chamber, said closed chamber being provided with an outlet aperture, a container for the substance located in said closed chamber and provided with an outlet aperture which registers with the aperture of the closed chamber, means for forcing the contents of said container through said apertures, a separable mold mounted adjacent to said apertures for receiving the contents from the container, and means for opening said mold to permit the contents thereof to drop into a receptacle.

6. An apparatus for dispensing semi-solid substances, comprising a cooling chamber, a closed chamber located within said cooling chamber and provided with an outlet aperture, a container for the substance located in said closed chamber and provided with an outlet aperture which registers with the aperture of the closed chamber, means for forcing the contents of said container through said apertures, a mold located adjacent to said apertures for receiving the substance from said container, a cone support, and means for discharging the contents of said mold into a cone carried by said support.

7. An apparatus for dispensing semi-solid substances, comprising a casing provided with a closed chamber spaced away from the walls of said casing to form a cooling chamber, said closed chamber having an open top and provided with an aperture in its bottom, a container for the substance located in said closed chamber and provided with an outlet aperture which registers with the aperture of the cylindrical member, means for forcing the contents of said container through said apertures, a mold located adjacent to said apertures for receiving the substance from said container, a cone support, and means for discharging the contents of said mold into a cone carried by said support.

8. An apparatus for dispensing semi-solid substances, comprising a casing, a closed chamber mounted in said casing and having an open top and being provided with an aperture in its bottom, a valve for closing said aperture, a cooling chamber surrounding said closed chamber, a container for the substance located in said closed chamber, and provided with an outlet aperture which registers with the aperture of the closed chamber, means for forcing the contents of said container through said apertures when said valve is opened, a mold located adjacent to said apertures for receiving the substance from the container, a cone support, and means for discharging the contents of said mold into a cone carried by said support.

9. An apparatus for dispensing frozen substances, comprising a casing, a container mounted in said casing surrounded by a cooling chamber and provided with an outlet aperture, a plurality of differently shaped separable molds movably mounted in said casing adjacent to said outlet aperture, means for bringing either one of said molds into alinement with said aperture, means for forcing the contents of said container through said aperture and into the mold which registers with the same, and means for opening said molds to permit the contents thereof to drop into a receptacle.

10. An apparatus for dispensing semi-solid substances, comprising a casing, a container mounted in said casing and provided with an outlet aperture, a plurality of differently shaped separable molds slidingly mounted in said casing beneath said container, means for bringing either one of said molds into alinement with said aperture, means for forcing the contents of said container through said aperture and into the mold which registers with the same, and means for opening said molds to permit the contents thereof to drop into a receptacle.

11. An apparatus for dispensing semi-solid substances, comprising a casing, a container mounted in said casing and provided with an outlet aperture, tracks mounted in said casing adjacent to said container, a plurality of differently shaped separable molds slidingly mounted on said tracks, means for bringing either one of said molds into register with said aperture, means for forcing the contents of said container through said aperture and into the mold which registers with the same, and means for opening said molds to permit the contents thereof to drop into a receptacle.

12. An apparatus for dispensing semi-solid substances, comprising a casing, a container mounted in said casing and provided with an outlet aperture, a rod slidingly mounted in said casing below said container, a plurality of differently shaped separable molds carried by said rod and adapted to be placed in register with the aperture by the same, means for forcing the contents of said container through said aperture and into the mold, which registers with the same, and means for opening said molds to permit the contents thereof to drop into a receptacle.

13. An apparatus for dispensing semi-solid substances, comprising a casing, a container mounted in said casing and provided with an outlet aperture, a rod slidingly mounted in said casing below said container, a plurality of molds carried by said rod and adapted to be placed in register with the aperture by the same, each of said molds being made of two parts hinged at their upper ends, means for forcing the contents of said container through said aperture and into the mold which is in register with the same, a mold opener mounted on the exterior of said casing, said rod being adapted to convey said molds to a position beneath said mold opener, and a rod for reciprocating said mold opener to open the mold which has been brought into alinement with the same.

14. In a machine for dispensing semi-solid substances, a dispensing container, means for forcing the contents from said container, and a mold into which said contents are ejected, said mold consisting of a movable part and a stationary part which are hinged together at their upper ends, and an annular plate connected to the outer edge of the upper end of one of said parts by a spring hinge and provided diametrically opposite said hinge with a hook which engages the outer edge of the upper end of the other of said parts.

15. In a machine for dispensing semi-solid substances, a dispensing container, means for forcing the contents from said container, a separable mold into which the contents are ejected, and means for opening said mold, said mold opening means comprising a plurality of legs connected together at their upper ends, means for forcing said legs downwardly into said mold, and means for spreading said legs apart as they descend.

16. A device for dispensing edible ice cream cones comprising a dispensing container, means for forcing the contents from the container, a separable mold into which the contents are ejected, a cone support, and means for opening said mold to permit the molded cream to drop into a cone carried by said support.

17. A device for dispensing edible ice cream cones, comprising a dispensing container, means for forcing the contents from the container, a separable mold into which the contents are ejected, a cone support, a cone carrier for supplying said support with cones, and means for opening said mold to permit the molded cream to drop into the cone held by said support.

18. The combination with mechanism for dispensing ice cream, of a cone carrier comprising a rotatable circular member having radial spokes between which the cones are supported, means for forcing said cones toward the periphery of said circular member, and means for moving the cones nearest the periphery off of said member.

19. The combination with mechanism for dispensing ice cream, of a cone carrier comprising a casing provided with a circular wall, having a swinging door on one side thereof, a shaft mounted in the center of the chamber formed by said wall, a carrier rotatably mounted on said shaft and consisting of a series of radial spokes which are spaced apart to support a series of cones, means for rotating said carrier, means for forcing the cones toward the periphery of the carrier as the same is rotated, and means carried by said wall for guiding the cones into said door.

In testimony whereof I affix my signature.

JAMES W. KENNEDY.